United States Patent [19]
Mathian

[11] Patent Number: 5,370,027
[45] Date of Patent: Dec. 6, 1994

[54] GUILLOTINE FOR CUTTING TABS

[76] Inventor: Louis Mathian, Rue de la Maritelle, 38320 Bresson, France

[21] Appl. No.: 124,800

[22] Filed: Sep. 22, 1993

[30] Foreign Application Priority Data

Sep. 29, 1992 [FR] France .................... 92 11917

[51] Int. Cl.⁵ ............................................. B26D 1/30
[52] U.S. Cl. ............................................. 83/527; 83/608
[58] Field of Search .................. 83/608, 607, 527; 74/424.8 A

[56] References Cited

U.S. PATENT DOCUMENTS

| | | | |
|---|---|---|---|
| 499,027 | 6/1893 | Lobee | 74/424.8 A |
| 3,638,933 | 2/1972 | Burnette et al. | 269/60 |
| 3,913,412 | 10/1975 | Hart et al. | 74/424.8 R |
| 5,241,735 | 9/1993 | Henning | 83/485 X |

FOREIGN PATENT DOCUMENTS

| | | |
|---|---|---|
| 0491633 | 6/1992 | European Pat. Off. . |
| 2527965 | 12/1983 | France . |
| 510541 | 10/1930 | Germany . |
| 3615128 | 11/1987 | Germany . |
| 2078902 | 1/1982 | United Kingdom . |
| 89/08002 | 9/1989 | WIPO . |

*Primary Examiner*—Richard K. Seidel
*Assistant Examiner*—Kenneth E. Peterson
*Attorney, Agent, or Firm*—Parkhurst, Wendel & Rossi

[57] ABSTRACT

A guillotine for cutting tabs includes a mobile part supporting a knife-blade. A mechanism with bolt and nut controls translation of the mobile part, which is guided and supported by a slide. The slide includes a rail made of a folded sheet metal and a carriage with four guide rollers. The mobile part bears a finger extending perpendicularly to the translation direction and engaged slidingly and rotationally in an orifice of the nut.

4 Claims, 2 Drawing Sheets

FIG. 3
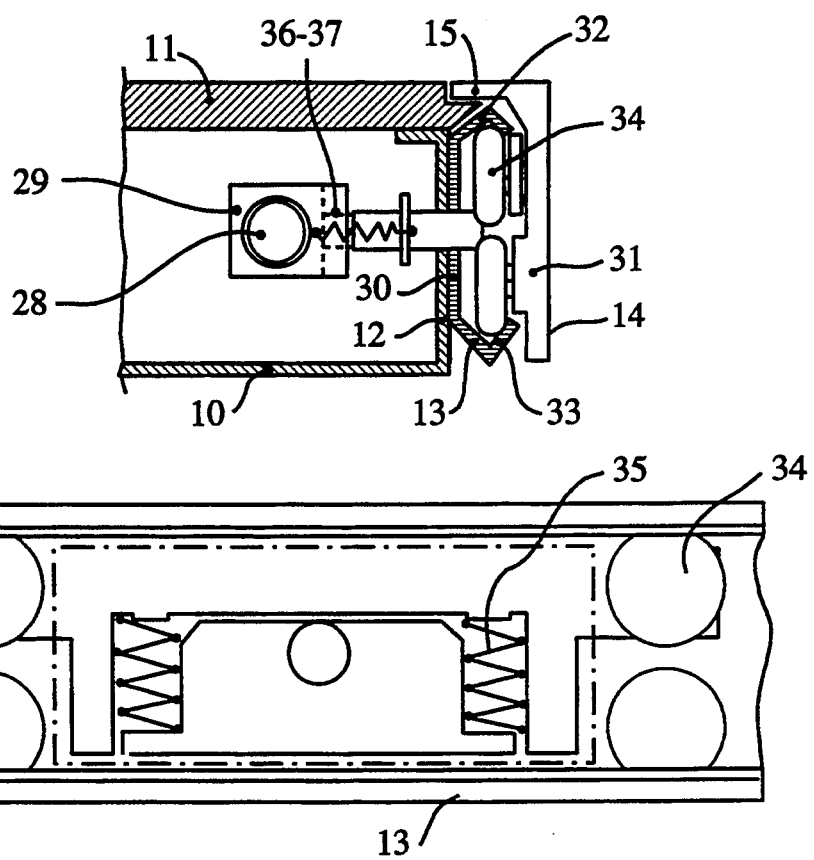
FIG. 4
FIG. 5
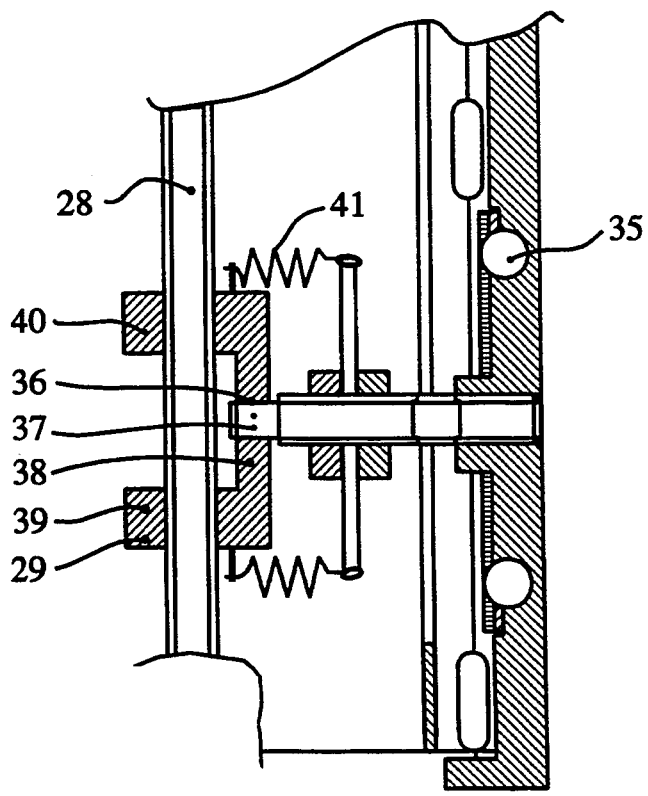

GUILLOTINE FOR CUTTING TABS

BACKGROUND OF THE INVENTION

The invention relates to an office guillotine having a frame able to be placed on a table, the frame comprising a fixed plate for supporting one or more sheets of paper to be cut, a mobile part mounted in translation with respect to the plate, a knife-blade supported by said mobile part and designed to move in a plane perpendicular to said plate and to cooperate with a counterblade to trim the sheet of paper placed on the plate and a translation mechanism with bolt and nut to move the mobile part, the knife-blade and counterblade having curved ends for cutting a strip and leaving a tab.

The drive system by bolt and nut, indispensable for accurate positioning of the knife-blade with respect to the fixed plate for cutting a tab, requires the use of a perfectly machined long bolt, and the use of a relatively powerful drive motor. Likewise the slide for guiding and support of the mobile part must be extremely accurate and these requirements weigh heavily on the manufacturing cost and therefore hinder the advantages of this apparatus.

SUMMARY OF THE INVENTION

The object of the present invention is to develop a guillotine of this kind with a view to enabling it to be manufactured from standard parts or from parts made by simple processes, while preserving the required accuracy.

According to the invention the link between the nut and said mobile part presents a degree of freedom in the direction perpendicular to the axis of the bolt to compensate for the variations of the distance separating the nut and the mobile part when the nut is tightened or loosened on the bolt.

Parallelism faults between the bolt and the mobile part and linearity faults of the bolt are compensated by the link according to the invention, between the bolt and the mobile part. This link of the articulated type is achieved by a drive finger, supported by the mobile part and extending perpendicularly to the direction of translation, and which fits slidingly and rotationally into a conjugate orifice of the bolt.

Precise positioning of the nut on the bolt is important for cutting the tabs and according to the invention the nut, of elongated shape, has at each of its ends a section in the form of a drive and/or guide sleeve cooperating with the bolt, the sections being spaced along the bolt. One or both of the end sections can be threaded such that only one guides the sleeve. This nut can be achieved in different ways, for example by two nuts spaced on a single support or preferably by a tubular sleeve whose center part is widened. It is indispensable to provide a certain clearance between the standard bolt and the nut, and this clearance causes noisy operation, which is advantageously attenuated by providing, according to the invention, an elastic device which urges the nut transversely up against the bolt.

According to another important development of the invention the slide for guiding and support of the mobile part is formed by a profiled rail and a carriage, one of which is supported by the mobile part and the other is securedly united to the fixed plate. The rail of C-shaped cross-section is fixed to the fixed plate parallel to the bolt and the carriage is secured united to the mobile part and is slidingly mounted inside the C-shaped rail to guide the mobile part in translation. The rail can be formed by a simple metal sheet whose longitudinal edges are folded and the carriage comprises two pairs of rollers, spaced out along the rail. One of the rollers of each pair cooperates with the bottom edge of the rail and the other roller of the pair cooperates with the top edge of the rail, the two top rollers being mounted bearing flexibly on the rail to compensate for manufacturing imperfections.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 3 is a cross-section along the line 3—3 of FIG. 1; FIG. 4 is a side view of the mobile part of the slide; FIG. 5 is a plan view of the nut.

DESCRIPTION OF THE PREFERRED EMBODIMENT

Figure 1:
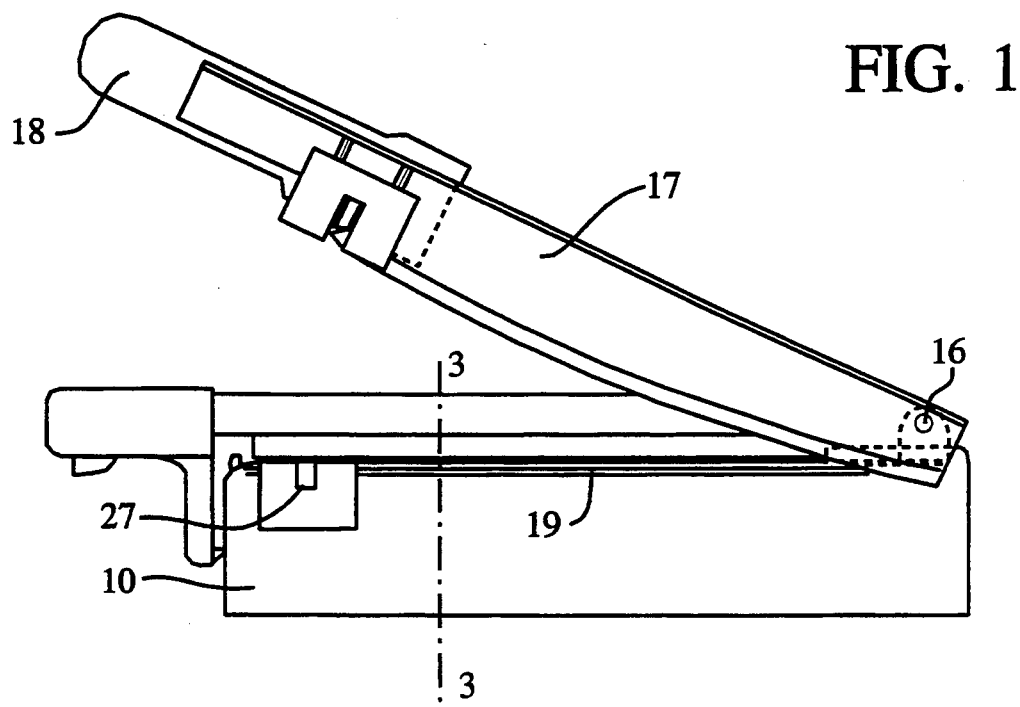
FIGS. 1 and 2 shown respectively elevational and plan views of a guillotine according to the invention, the knife-blade being represented partly raised in FIG. 1 and lowered in FIG. 2.
Figure 2:
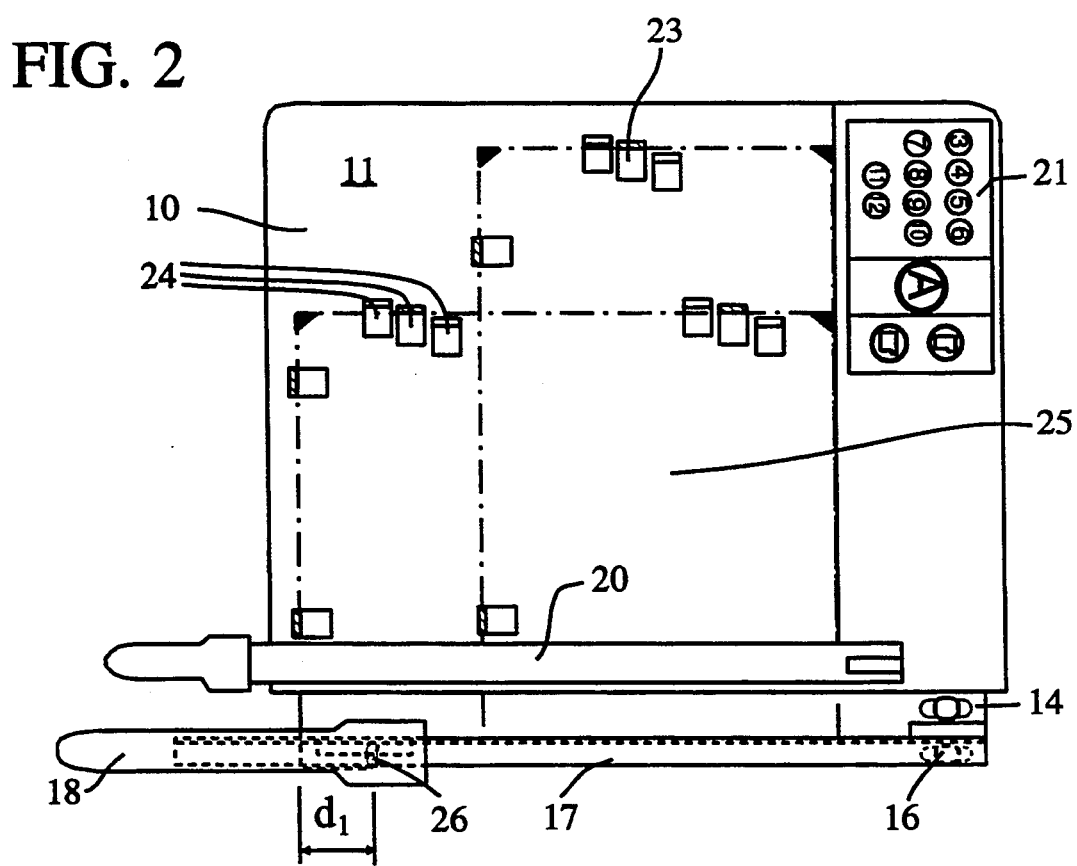

In the drawings, a frame 10 of general parallelepipedic shape has on its upper face a plate 11 for supporting sheets of paper 25, represented by the mixed line in FIG. 2. To one of the side edges 12 of the frame 10 there is securedly united a slide 13 for support and guiding of a mobile part 14. A knife-blade 17 is articulated at 16 on the end of the mobile part 14 to move in a plane perpendicular to the plate 11 due to the action of an operating handle 18. The mobile part 14 bears a counterblade 19 and the frame 10 bears a bar 20 for compressing the sheets 25 to be cut, which are positioned on the plate 11 at predetermined locations 24 by stops 23. The end 26 of the knife-blade 17 is curved as is the end 27 of the counterblade 19. According to the position of the sheet 25 with respect to the knife-blade 17, the latter cuts a strip leaving a tab of more or less great length "dl". The position of the sheet 15 is adjustable by moving the mobile part 14 to cut tabs of different lengths and this movement is controled by a microprocessor with a keypad 21, which controls rotation of a screw drive motor to drive bolt 28, which extends parallel to the translation direction of the mobile part 14, defined by the guiding and support slide 13. The mobile part 14 is connected to a nut 29 which is screwed onto the bolt 28, and moves with the nut 29 when the bolt 28 rotates.

Referring more particularly to FIGS. 3 and 4 it can be seen that the slide 13 is formed by a C-shaped profiled rail 30 and a carriage 31, the rail 30 being parallel to the bolt 28 and secured united to the plate 11, whereas the carriage 31 is rigidly secured to the mobile part 14, preferably on the same side as the handle 18. The rail 30 is a simple metal sheet whose two longitudinal edges are folded to form two guiding grooves 32, 33 facing one another. The carriage 31 is a simple plate which supports four loose rollers 34, forming two pairs of rollers spaced apart in the translation direction of the mobile part 14, parallel to the bolt 28. In the example illustrated by the figures of the rail 30, two rollers 34 cooperate with the top groove 32 and two with the bottom groove 33 to support efficiently and guide the carriage 31. The two top rollers 34 are urged elastically into contact with the rail 30 to compensate for imprecisions of manufacture of the rail 30, these rollers 34 being for example supported by a common support subjected to the action of one or more springs 35. The slide assembly 13 is particularly simple and ensures easy translation of the mobile part 14.

FIG. 5 illustrates the embodiment of the drive mechanism of the mobile part 14 with bolt 28 and nut 29. The nut 29 in the form of an elongated sleeve presents, facing the carriage 31, an orifice 36 perpendicular to the axis of the bolt 28, in which there is engaged with small clearance a cylindrical or spherical finger 37 securedly united to the carriage 31. It can easily be seen that the finger 37 and orifice 36 form an articulation, which immobilizes the nut 29 in rotation and transmits the translation movement of the nut 29 to the mobile part 14, when rotation of the bolt 28 takes place. The dimension of the nut 29, in the longitudinal direction of the bolt 28, is relatively large to ensure good guiding, but with a view to reducing the friction forces, the tubular center section 38 is of enlarged cross-section to prevent any contact between this section and the bolt 28. One or both of the two end sections 39, 40 can be threaded, such that one performs simple guiding. It should be noted that the same effect can be obtained by eliminating the center section 38 and fixing the two end sections 39, 40 spaced apart on a common support. The bolt 28 is a standard off-the-shelf bolt and the structure of the nut 29 and that of the articulated link between the nut 29 and carriage 31 of the mobile part 14 compensate for imperfections of manufacture. The nut 29 engages the bolt 28 with small clearance, but this clearance generates an unpleasant noise when the bolt 28 rotates quickly. According to the invention, this noise is attenuated by associating a flexible system with the articulated link 36, 37, such as a spring 41, which urges the nut 29 transversely against the bolt 28. It can easily be seen that the drive and guide system of the mobile part 14, particular to the guillotine for cutting tabs, is simple and of limited manufacturing cost.

I claim:

1. An office guillotine, comprising:
   a frame including a fixed plate for supporting sheets of papers which are to be cut;
   a mobile part which is movable with respect to said fixed plate along a first direction;
   a knife blade supported by said mobile part, said knife blade being adapted to move in a plane which is perpendicular to said fixed plate and parallel to said first direction;
   a counter blade supported by said mobile part and positioned to cooperate with said knife blade to cut sheets of paper, each of said knife blade and counter blade having a curved end to cut tabs in the sheets of paper;
   a translation mechanism for moving said mobile part, said translation mechanism comprising a bolt extending substantially parallel to said first direction, a nut threaded on said bolt, said nut having a cylindrical orifice extending along a second direction which is substantially perpendicular to said first direction, and a mechanical link for connecting said nut to said mobile part, said mechanical link comprising a cylindrical drive finger which is secured to said mobile part and extends along said second direction and into said cylindrical orifice in said nut, said drive finger being rotatable in said cylindrical orifice and axially slidable in said cylindrical orifice along said second direction.

2. The office guillotine of claim 1, wherein said nut comprises two end portions spaced apart along a direction of extension of said bolt and a widened central portion between said two end portions, at least one of said two end portions being threaded to engage said bolt, and said widened central portion allowing passage of said bolt therethrough.

3. The office guillotine of claim 1, further comprising biasing means to urge said nut against said bolt.

4. The office guillotine of claim 1, further comprising a slide secured to said fixed plate for guiding and supporting said mobile part, said slide comprising a profiled rail having folded longitudinal edges, and a carriage secured to said movable part, said carriage including two pairs of rollers which engage and are biased against said profiled rail such that said carriage is movable along said first direction with respect to said profiled rail.

* * * * *